(12) United States Patent
Chen et al.

(10) Patent No.: US 9,641,916 B2
(45) Date of Patent: May 2, 2017

(54) OPTICAL CHANNEL DATA UNIT SERVICE TRANSMISSION APPARATUS AND METHOD

(71) Applicant: Huawei Technologies Co., Ltd., Shenzhen (CN)

(72) Inventors: Zhiyun Chen, Chengdu (CN); Huiyu Zhou, Chengdu (CN); Jianying Wei, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/853,445

(22) Filed: Sep. 14, 2015

(65) Prior Publication Data

US 2016/0007103 A1  Jan. 7, 2016

Related U.S. Application Data

(63) Continuation of application No. PCT/CN2013/072766, filed on Mar. 15, 2013.

(51) Int. Cl.
*H04Q 11/00* (2006.01)
*H04L 12/64* (2006.01)
*H04J 3/16* (2006.01)

(52) U.S. Cl.
CPC ........ *H04Q 11/0003* (2013.01); *H04J 3/1652* (2013.01); *H04L 12/6418* (2013.01); *H04Q 11/0062* (2013.01); *H04J 2203/0085* (2013.01); *H04Q 2011/0064* (2013.01); *H04Q 2011/0088* (2013.01)

(58) Field of Classification Search
USPC .......................................................... 398/52
See application file for complete search history.

(56) References Cited

U.S. PATENT DOCUMENTS

| 7,738,596 B2 | 6/2010 | Lin et al. |
| 2007/0065078 A1* | 3/2007 | Jiang .................. H04L 12/2861 385/76 |

(Continued)

FOREIGN PATENT DOCUMENTS

| CN | 101212424 A | 7/2008 |
| CN | 101217334 A | 7/2008 |

(Continued)

OTHER PUBLICATIONS

ITU-T, Series G: Transmission Systems and Media, Digital Systems and Networks, International Telecommunication Union, G.709/Y. 1331, Feb. 2012, 238 pages.

(Continued)

*Primary Examiner* — David Payne
*Assistant Examiner* — Omar S Ismail
(74) *Attorney, Agent, or Firm* — Slater Matsil, LLP

(57) ABSTRACT

The present invention relates to the field of communication transmission, and in particular, discloses an optical channel data unit service transmission apparatus and method. The switching apparatus includes a first ODU service processing unit, a timeslot allocating unit, a switching output port allocating unit, an Ethernet switching unit, and a second ODU service processing unit, and forwards an ODU service according to a timeslot mapping table and a frame period timeslot table corresponding to the ODU service.

12 Claims, 9 Drawing Sheets

(56) References Cited

U.S. PATENT DOCUMENTS

| | | |
|---|---|---|
| 2007/0211750 A1 | 9/2007 | Li et al. |
| 2009/0074410 A1 | 3/2009 | Zou et al. |
| 2009/0154479 A1 | 6/2009 | Kim et al. |
| 2011/0013635 A1 | 1/2011 | Wan et al. |
| 2011/0135302 A1* | 6/2011 | Kang ............... H04L 45/62 398/43 |
| 2011/0170866 A1 | 7/2011 | Loprieno et al. |
| 2011/0255552 A1 | 10/2011 | Ellegard |
| 2011/0286744 A1 | 11/2011 | Shin et al. |
| 2012/0002671 A1 | 1/2012 | Xiao et al. |
| 2012/0002965 A1 | 1/2012 | Bellato et al. |
| 2012/0230350 A1* | 9/2012 | Katagiri ............ H04J 3/1652 370/474 |
| 2012/0251127 A1* | 10/2012 | Ohkubo ............ H04J 3/1652 398/182 |
| 2014/0177652 A1 | 6/2014 | Su et al. |
| 2015/0093113 A1 | 4/2015 | Vissers et al. |
| 2015/0264454 A1 | 9/2015 | Xiao et al. |

FOREIGN PATENT DOCUMENTS

| | | |
|---|---|---|
| CN | 101610242 A | 12/2009 |
| CN | 101834688 A | 9/2010 |
| CN | 101841741 A | 9/2010 |
| CN | 101389146 B | 1/2011 |
| CN | 102291631 A | 12/2011 |
| CN | 102369681 A | 3/2012 |
| CN | 102439995 A | 5/2012 |
| CN | 102594648 A | 7/2012 |
| CN | 102684994 A | 9/2012 |
| CN | 103222237 A | 7/2013 |
| EP | 2451185 A1 | 5/2012 |
| EP | 2833580 A1 | 2/2015 |
| JP | 2012165110 A | 8/2012 |
| WO | 2012084527 A1 | 6/2012 |

OTHER PUBLICATIONS

Wang, "Research on Information Packaging Technology of OTN Optical Channel Layer," Apr. 13, 2012, 69 pages.

* cited by examiner

| Timeslot sequence number | 1 | 2 | 3 | 4 | 5 | 6 | 7 | 8 | 9 | 10 | ... | 18 | 19 | 20 | 21 | 22 | 23 | 24 |
|---|---|---|---|---|---|---|---|---|---|---|---|---|---|---|---|---|---|---|
| ODU service | o1 | o2 | o1 | o2 | o1 | o2 | o1 | o2 | o1 | o2 | ... | o2 | o1 | o2 | o1 | o2 | o1 | o2 |

FIG. 4a

| Timeslot sequence number | 1 | 2 | 3 | 4 | 5 | 6 | 7 | 8 | ... | 18 | 19 | 20 | 21 | 22 | 23 | 24 |
|---|---|---|---|---|---|---|---|---|---|---|---|---|---|---|---|---|
| ODU service | si1 | si2 | si1 | si2 | si1 | si2 | si1 | si2 | ... | si2 | si1 | si2 | si1 | si2 | si1 | si2 |

FIG. 4b

| Timeslot sequence number | 1 | 2 | 3 | 4 | 5 | 6 | 7 | 8 | ... | 18 | 19 | 20 | 21 | 22 | 23 | 24 |
|---|---|---|---|---|---|---|---|---|---|---|---|---|---|---|---|---|
| ODU service | so2 | so1 | so2 | so1 | so2 | so1 | so2 | so1 | ... | so1 | so2 | so1 | so2 | so1 | so2 | so1 |

FIG. 4c

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| ODU sub-service 1 | o1 | o2 | o3 | o4 | o1 | o2 | o3 | o4 | o1 | o2 | o3 | o4 |
| ODU sub-service 2 | o2 | | | | o3 | | | | o4 | | | |

| 13 | 14 | 15 | 16 | 17 | 18 | 19 | 20 | 21 | 22 | 23 | 24 |
|---|---|---|---|---|---|---|---|---|---|---|---|
| o1 | o2 | o3 | o4 | o1 | o2 | o3 | o4 | o1 | o2 | o3 | o4 |
| o2 | | | | o3 | | | | o4 | | | |

FIG. 6a

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| ODU sub-service 1 | si1 | si2 | si3 | si4 | si1 | si2 | si3 | si4 | si1 | si2 | si3 | si4 |
| ODU sub-service 2 | si2 | | | | si3 | | | | si4 | | | |

| 13 | 14 | 15 | 16 | 17 | 18 | 19 | 20 | 21 | 22 | 23 | 24 |
|---|---|---|---|---|---|---|---|---|---|---|---|
| si1 | si2 | si3 | si4 | si1 | si2 | si3 | si4 | si1 | si2 | si3 | si4 |
| si2 | | | | si3 | | | | si4 | | | |

FIG. 6b

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| ODU sub-service 1 | so2 | so3 | so4 | so1 | so2 | so3 | so4 | so1 | so2 | so3 | so4 | so1 |
| ODU sub-service 2 | so3 | | | | so4 | | | | so1 | | | |

| 13 | 14 | 15 | 16 | 17 | 18 | 19 | 20 | 21 | 22 | 23 | 24 |
|---|---|---|---|---|---|---|---|---|---|---|---|
| so2 | so3 | so4 | so1 | so2 | so3 | so4 | so1 | so2 | so3 | so4 | so1 |
| so3 | | | | so4 | | | | so1 | | | |

FIG. 6c

| Timeslot sequence number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| ODU sub-service 1 | o1 | o2 | o3 | o4 | o1 | o2 | o3 | o4 | o1 | o2 | o3 | o4 | o1 | o2 | o3 | o4 | o1 | o2 | o3 | o4 | o1 | o2 | o3 | o4 |
| ODU sub-service 2 | o2 |  |  |  | o3 |  |  |  | o4 |  |  |  | o2 |  |  |  | o3 |  |  |  | o4 |  |  |  |
| ODU sub-service 3 |  |  | o1 |  |  |  |  |  |  |  | o1 |  |  |  |  |  |  |  | o1 |  |  |  |  |  |

FIG. 8a

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| ODU sub-service 1 | si1 | si2 | si3 | si4 | si1 | si2 | si3 | si4 | si1 | si2 | si3 | si4 |
| ODU sub-service 2 | si2 |  |  |  | si3 |  |  |  | si4 |  |  |  |
| ODU sub-service 3 |  |  | si1 |  |  |  |  |  |  |  | si1 |  |

| 13 | 14 | 15 | 16 | 17 | 18 | 19 | 20 | 21 | 22 | 23 | 24 |
|---|---|---|---|---|---|---|---|---|---|---|---|
| si1 | si2 | si3 | si4 | si1 | si2 | si3 | si4 | si1 | si2 | si3 | si4 |
| si2 |  |  |  | si3 |  |  |  | si4 |  |  |  |
|  |  |  |  |  |  | si1 |  |  |  |  |  |

FIG. 8b

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| ODU sub-service 1 | so2 | so3 | so4 | so1 | so2 | so3 | so4 | so1 | so2 | so3 | so4 | so1 |
| ODU sub-service 2 | so3 |  |  |  | so4 |  |  |  | so1 |  |  |  |
| ODU sub-service 3 |  |  | so2 |  |  |  |  |  |  |  | so2 |  |

| 13 | 14 | 15 | 16 | 17 | 18 | 19 | 20 | 21 | 22 | 23 | 24 |
|---|---|---|---|---|---|---|---|---|---|---|---|
| so2 | so3 | so4 | so1 | so2 | so3 | so4 | so1 | so2 | so3 | so4 | so1 |
| so3 |  |  |  | so4 |  |  |  | so1 |  |  |  |
|  |  |  |  |  |  | so2 |  |  |  |  |  |

FIG. 8c

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| ODU sub-service 1 | o1 | o2 | o3 | o4 | o1 | o2 | o3 | o4 | o1 | o2 | o3 | o4 |
| ODU sub-service 2 | o2 | | | | o3 | | | | o4 | | | |

FIG. 9a

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| ODU sub-service 1 | si1 | si2 | si3 | si4 | si1 | si2 | si3 | si4 | si1 | si2 | si3 | si4 |
| ODU sub-service 2 | si2 | | | | si3 | | | | si4 | | | |

FIG. 9b

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| ODU sub-service 1 | so2 | so3 | so4 | so1 | so2 | so3 | so4 | so1 | so2 | so3 | so4 | so1 |
| ODU sub-service 2 | so3 | | | | so4 | | | | so1 | | | |

FIG. 9c

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| ODU service | o1 | o2 | o1 | o2 | o1 | o2 | o1 | o2 | o1 | o2 | o1 | o2 |

FIG. 10a

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| ODU service | si1 | si2 | si1 | si2 | si1 | si2 | si1 | si2 | si1 | si2 | si1 | si2 |

FIG. 10b

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| ODU service | so2 | so1 | so2 | so1 | so2 | so1 | so2 | so1 | so2 | so1 | so2 | so1 |

FIG. 10c

OPTICAL CHANNEL DATA UNIT SERVICE TRANSMISSION APPARATUS AND METHOD

This application is a continuation of International Application No. PCT/CN2013/072766, filed on Mar. 15, 2013, which is hereby incorporated by reference in its entirety.

TECHNICAL FIELD

The present invention relates to the field of communication transmission, and in particular, to an optical channel data unit (ODU) service transmission apparatus and method.

BACKGROUND

With the rapid development of communication networks, there are more service types, such as mobile, voice, video, online game, and Internet browsing, and a larger bandwidth is required. To transmit a service such as a time division multiplexing service, complicated service classification must be performed on a communication network, and a processing process of a switching device must be simplified as much as possible, so as to improve processing efficiency and quality of the switching device.

FIG. 1 is a schematic diagram of a switching apparatus for an optical channel data unit (ODU) of a time division multiplexing service in the prior art. The switching apparatus of the ODU performs switching based on cells and includes an ODU service receiving line card, a cell switching unit, and an ODU service sending line card. The ODU service receiving line card further includes a demapping unit and an interface control unit. The ODU service receiving line card extracts bit stream data of a payload from a received ODU service by using the demapping unit; the interface control unit is configured to encapsulate the extracted bit stream data of the payload into a time division multiplexing cell frame, where an identifier of the ODU service sending line card is carried in overheads of the time division multiplexing cell frame. The cell switching unit sends the time division multiplexing cell frame to the ODU service sending line card corresponding to the identifier according to the identifier of the ODU service sending line card carried in the overheads of the time division multiplexing cell frame. The service sending line card further includes an interface control unit and a mapping unit. The interface control unit is configured to extract a payload of the received time division multiplexing cell frame to generate a bit stream of a cell. The mapping unit uses a byte interleaving manner to recover the ODU of the time division multiplexing service according to configurations on a network management system.

In the prior art, forwarding based on Ethernet switching cannot be performed on an optical channel data unit ODU of a time division multiplexing service, which reduces compatibility of a device.

SUMMARY

The present invention provides an optical channel data unit service transmission apparatus and method.

A first aspect provides an optical channel data unit ODU service transmission apparatus, which includes a first ODU service processing unit, a timeslot allocating unit, a switching output port allocating unit, an Ethernet switching unit, and a second ODU service processing unit.

The first ODU service processing unit is configured to receive an ODU service, encapsulate an ODU frame into an Ethernet frame according to a slice length of the ODU frame, and send the Ethernet frame to the Ethernet switching unit according to an output port timeslot mapping table of the first ODU service processing unit determined by the timeslot allocating unit.

The timeslot allocating unit is configured to generate a synchronous frame period, and determine the output port timeslot mapping table of the first ODU service processing unit according to an obtained rate of the ODU frame and the number of output ports of the first ODU service processing unit.

The switching output port allocating unit is configured to determine an input port frame period timeslot table of the Ethernet switching unit according to the output port timeslot mapping table of the first ODU service processing unit determined by the timeslot allocating unit, determine an output port frame period timeslot table of the Ethernet switching unit according to the input port frame period timeslot table of the Ethernet switching unit, and determine an allocation forwarding command of the Ethernet switching unit according to the input port frame period timeslot table of the Ethernet switching unit and the output port frame period timeslot table of the Ethernet switching unit.

The Ethernet switching unit is configured to forward the received Ethernet frame to the second ODU service processing unit according to the allocation forwarding command of the Ethernet switching unit.

The second ODU service processing unit is configured to decapsulate the received Ethernet frame according to the output port frame period timeslot table of the Ethernet switching unit determined by the switching output port allocating unit, obtain bit stream data of an Ethernet payload, and encapsulate the bit stream data of the Ethernet payload into an ODU frame to send the ODU frame.

With reference to the first aspect, in a first possible implementation manner of the first aspect, the apparatus further includes a synchronization clock unit, configured to provide a clock signal for the timeslot allocating unit, where the clock signal is used for synchronizing reference time of the synchronous frame period so that each frame period generated by the timeslot allocating unit is synchronous in time.

With reference to the first aspect or the first possible implementation manner of the first aspect, in a second possible implementation manner of the first aspect, the first ODU service processing unit includes an overhead extracting unit, an Ethernet encapsulating unit, and a port distributing unit. The overhead extracting unit is configured to receive the ODU service, extract overhead information of the ODU frame in the ODU service, identify the ODU service according to the overhead information, and obtain a type of the ODU frame in the ODU service.

The Ethernet encapsulating unit is configured to determine the rate of the ODU frame according to the extracted overhead information, and encapsulate the ODU frame into the Ethernet frame according to the rate of the ODU frame and the slice length of the ODU frame.

The port distributing unit is configured to send the Ethernet frame to the Ethernet switching unit according to the output port timeslot mapping table of the first ODU service processing unit determined by the timeslot allocating unit.

With reference to the first possible implementation manner or the second possible implementation manner of the first aspect, in a third possible implementation manner of the first aspect, the timeslot allocating unit is configured to generate the synchronous frame period, determine the number of timeslots in the synchronous frame period that are occupied by the ODU frame and the slice length of the ODU frame according to the obtained rate of the ODU frame, an output port rate of the first ODU service processing unit, and the synchronous frame period, and determine, based on an interleaving allocation method, the output port timeslot mapping table of the first ODU service processing unit including a mapping relationship between an output port of the first ODU service processing unit and a timeslot in the synchronous frame period.

With reference to the first aspect, the first possible implementation manner of the first aspect, the second possible implementation manner of the first aspect or the third possible implementation manner of the first aspect, in a fourth possible implementation manner of the first aspect, the timeslot allocating unit is configured to generate the synchronous frame period, determine the number of timeslots in the synchronous frame period that are occupied by the ODU frame and the slice length of the ODU frame according to the obtained rate of the ODU frame and the synchronous frame period and based on a mapping relationship between a rate multiple of the ODU frame and the number of timeslots in the synchronous frame period that are occupied by the ODU frame, and determine, based on an interleaving allocation method, the output port timeslot mapping table of the first ODU service processing unit including a mapping relationship between an output port of the first ODU service processing unit and a timeslot in the synchronous frame period.

A second aspect provides an optical channel data unit service transmission method, which includes: receiving an ODU service, encapsulating an ODU frame into an Ethernet frame according to a slice length of the ODU frame, and sending the Ethernet frame to an Ethernet switching unit according to an output port timeslot mapping table of a first ODU service processing unit determined by a timeslot allocating unit, where the timeslot mapping table is determined according to a synchronous frame period, a rate of the ODU frame, and the number of output ports of the first ODU service processing unit; forwarding the received Ethernet frame to a second ODU service processing unit according to an allocation forwarding command of the Ethernet switching unit, where the allocation forwarding command of the Ethernet switching unit is determined according to an input port frame period timeslot table of the Ethernet switching unit and an output port frame period timeslot table of the Ethernet switching unit, the output port frame period timeslot table of the Ethernet switching unit is determined according to the input port frame period timeslot table of the Ethernet switching unit, and the input port frame period timeslot table of the Ethernet switching unit is determined according to the output port timeslot mapping table of the first ODU service processing unit determined by the timeslot allocating unit; and decapsulating the received Ethernet frame according to the output port frame period timeslot table of the Ethernet switching unit, obtaining bit stream data of an Ethernet payload, and encapsulating the bit stream data of the Ethernet payload into a high-order ODU frame to send the high-order ODU frame.

With reference to the second aspect, in a first possible implementation manner of the second aspect, the method further includes: generating a clock signal, where the clock signal is used for synchronizing reference time of the synchronous frame period so that each frame period of the synchronous frame period is synchronous in time.

With reference to the second aspect or the first possible implementation manner of the second aspect, in a second possible implementation manner of the second aspect, the step of receiving an ODU service, encapsulating an ODU frame into an Ethernet frame according to a slice length of the ODU frame, and sending the Ethernet frame to an Ethernet switching unit according to an output port timeslot mapping table of a first ODU service processing unit determined by a timeslot allocating unit is specifically: receiving the ODU service, extracting overhead information of the ODU frame in the ODU service, identifying the ODU service according to the overhead information, and obtaining a type of the ODU frame in the ODU service; determining the rate of the ODU frame according to the extracted overhead information, and encapsulating the ODU frame into the Ethernet frame according to the rate of the ODU frame and the slice length of the ODU frame; and sending the Ethernet frame to the Ethernet switching unit according to the output port timeslot mapping table of the first ODU service processing unit determined by the timeslot allocating unit.

With reference to the first possible implementation manner or the second possible implementation manner of the second aspect, in a third possible implementation manner of the second aspect, the determining of the timeslot mapping table is specifically: generating the synchronous frame period, determining the number of timeslots in the synchronous frame period that are occupied by the ODU frame and the slice length of the ODU frame according to the obtained rate of the ODU frame, an output port rate of the first ODU service processing unit, and the synchronous frame period, and determining, based on an interleaving allocation method, the output port timeslot mapping table of the first ODU service processing unit including a mapping relationship between an output port of the first ODU service processing unit and a timeslot in the synchronous frame period.

With reference to the second aspect, the first possible implementation manner of the second aspect, the second possible implementation manner of the second aspect or the third possible implementation manner of the second aspect, in a fourth possible implementation manner of the second aspect, the determining of the timeslot mapping table is specifically: generating the synchronous frame period, determining the number of timeslots in the synchronous frame period that are occupied by the ODU frame and the slice length of the ODU frame according to the obtained rate of the ODU frame and the synchronous frame period and based on a mapping relationship between a rate multiple of the ODU frame and the number of timeslots in the synchronous frame period that are occupied by the ODU frame, and determining, based on an interleaving allocation method, the output port timeslot mapping table of the first ODU service processing unit including a mapping relationship between an output port of the first ODU service processing unit and a timeslot in the synchronous frame period.

It can be seen from the foregoing that, in the embodiments of the present invention, an ODU service is forwarded according to an output port timeslot mapping table of a first ODU service processing unit and an allocation forwarding command of an Ethernet switching unit by using the first ODU service processing unit, a timeslot allocating unit, a switching output port allocating unit, the Ethernet switching unit, and a second ODU service processing unit, which solves the problem in the prior art where an ODU frame cannot be transmitted by an Ethernet switching unit, ensures that service congestion does not occur on a forwarding port of a transmission apparatus, and improves transmission quality of a communication network.

BRIEF DESCRIPTION OF THE DRAWINGS

The accompanying drawings described herein are provided for further understanding of the present invention, and form a part of this application, rather than a limitation on the present invention. In the accompanying drawings:

FIGS. 4a-4c show a timeslot mapping table and a frame period timeslot table corresponding to the second embodiment of the present invention;

FIGS. 6a-6c show a timeslot mapping table and a frame period timeslot table corresponding to the third embodiment of the present invention;

FIGS. 8a-8c show a timeslot mapping table and a frame period timeslot table corresponding to the fourth embodiment of the present invention;

FIGS. 9a-9c show a timeslot mapping table and a frame period timeslot table corresponding to another embodiment of the present invention;

FIGS. 10a-10c show a timeslot mapping table and a frame period timeslot table corresponding to another embodiment of the present invention;

DETAILED DESCRIPTION OF ILLUSTRATIVE EMBODIMENTS

For the convenience of understanding and implementing the present invention by a person of ordinary skill in the prior art, the embodiments of the present invention are currently described with reference to the accompanying drawings. Here, the exemplary embodiments of the present invention and the descriptions thereof are used for explaining the present invention, instead of limiting the present invention.

Figure 1:
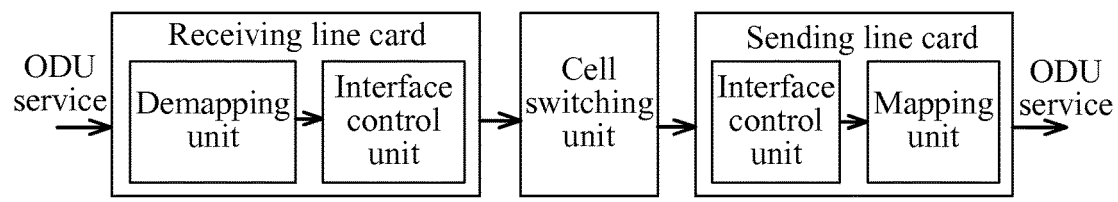
FIG. 1 is a schematic diagram of a switching apparatus for an optical channel data unit ODU of a time division multiplexing service in the prior art.
Figure 2:
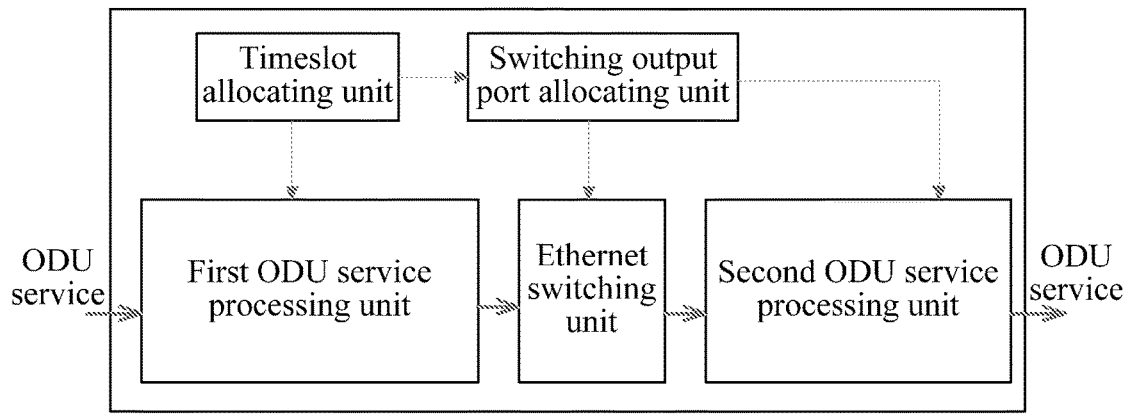
FIG. 2 is a schematic diagram of an ODU service transmission apparatus according to a first embodiment of the present invention.

FIG. 2 is a schematic diagram of an ODU service transmission apparatus according to a first embodiment of the present invention. The transmission apparatus includes: a first ODU service processing unit, a timeslot allocating unit, a switching output port allocating unit, an Ethernet switching unit, and a second ODU service processing unit.

The first ODU service processing unit is configured to receive an ODU service, encapsulate an ODU frame into an Ethernet frame according to a slice length of the ODU frame, and send the Ethernet frame to the Ethernet switching unit according to an output port timeslot mapping table of the first ODU service processing unit determined by the timeslot allocating unit.

The timeslot allocating unit is configured to generate a synchronous frame period, and determine the output port timeslot mapping table of the first ODU service processing unit and the slice length of the ODU frame according to an obtained rate of the ODU frame and the number of output ports of the first ODU service processing unit.

The switching output port allocating unit is configured to determine an input port frame period timeslot table of the Ethernet switching unit according to the output port timeslot mapping table of the first ODU service processing unit determined by the timeslot allocating unit, determine an output port frame period timeslot table of the Ethernet switching unit according to the input port frame period timeslot table of the Ethernet switching unit, and determine an allocation forwarding command of the Ethernet switching unit according to the input port frame period timeslot table of the Ethernet switching unit and the output port frame period timeslot table of the Ethernet switching unit.

The Ethernet switching unit is configured to forward the received Ethernet frame to the second ODU service processing unit according to the allocation forwarding command of the Ethernet switching unit.

The second ODU service processing unit is configured to decapsulate the received Ethernet frame according to the output port frame period timeslot table of the Ethernet switching unit determined by the switching output port allocating unit, obtain bit stream data of an Ethernet payload, and encapsulate the bit stream data of the Ethernet payload into an ODU frame to send the ODU frame.

The number of timeslots in the synchronous frame period may be set to an integer according to a service type. The synchronous frame period may be formed by several Ethernet frame timeslots. The number of Ethernet frame timeslots forming the synchronous frame period must be greater than or equal to the number of output ports of the first ODU service processing unit, and be less than 1000, that is, the number is generally a number in tens or hundreds. The timeslot allocating unit ensures, according to a timeslot interleaving allocating algorithm, discreteness and uniformity of timeslots in the synchronous frame period to which the ODU services are allocated.

Further, this embodiment of the present invention may further be that, the ODU service received by the first ODU service processing unit includes at least two ODU sub-services, and the at least two ODU sub-services may be high-order ODU services of different types, or high-order ODU services of the same type but of different customers.

The ODU service transmission apparatus in this embodiment of the present invention may further include two or more first ODU service processing units. This embodiment of the present invention may further include two or more second ODU service processing units. The two or more first ODU service processing units are separately connected to an input port of the Ethernet switching unit. The two or more second ODU service processing units are separately connected to an output port of the Ethernet switching unit. The timeslot allocating unit is connected to the plurality of first ODU service processing units.

The timeslot allocating unit ensures, according to the timeslot interleaving allocating algorithm, the discreteness and uniformity of the timeslots in the synchronous frame period to which the ODU services are allocated. The switching output port allocating unit ensures, according to the timeslot interleaving allocating algorithm, timeslot allocation of an input interface and an output interface of the Ethernet switching unit, so that the Ethernet switching unit forwards the received Ethernet frame to the second ODU service processing unit according to the allocation forwarding command of the Ethernet switching unit generated by the switching output port allocating unit.

In this embodiment of the present invention, an ODU service is forwarded according to an output port timeslot mapping table of a first ODU service processing unit and an allocation forwarding command of an Ethernet switching unit by using the first ODU service processing unit, a timeslot allocating unit, a switching output port allocating unit, the Ethernet switching unit, and a second ODU service processing unit, which solves the problem in the prior art where an ODU frame cannot be transmitted by an Ethernet switching unit, ensures that service congestion does not occur on a forwarding port of a transmission apparatus, and improves transmission quality of a communication network.

Figure 3:
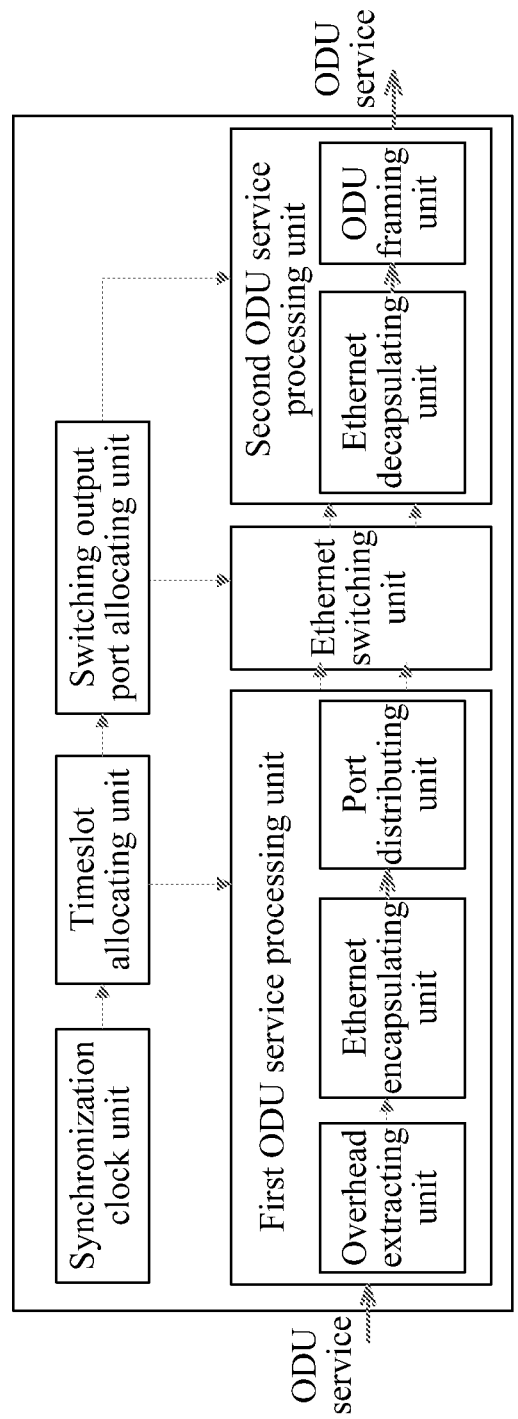
FIG. 3 is a schematic diagram of an ODU service transmission apparatus according to a second embodiment of the present invention.

FIG. 3 is a schematic diagram of an ODU service transmission apparatus according to a second embodiment of the present invention. The apparatus includes a synchronization clock unit, a first ODU service processing unit, a timeslot allocating unit, a switching output port allocating unit, an Ethernet switching unit, and a second ODU service processing unit.

The synchronization clock unit is configured to provide a clock signal for the timeslot allocating unit, where the clock signal is used for synchronizing reference time of a synchronous frame period so that each frame period generated by the timeslot allocating unit is synchronous in time.

Further, the first ODU service processing unit in this embodiment of the present invention may further specifically include an overhead extracting unit, an Ethernet encapsulating unit, and a port distributing unit. The overhead extracting unit is configured to receive an ODU service, extract overhead information of an ODU frame in the ODU service, identify the ODU service according to the overhead information, and obtain a type of the ODU frame in the ODU service. The Ethernet encapsulating unit is configured to determine a rate of the ODU frame according to the extracted overhead information, and encapsulate the ODU frame into an Ethernet frame according to the rate of the ODU frame and a slice length of the ODU frame. The port distributing unit is configured to send the Ethernet frame to the Ethernet switching unit according to an output port timeslot mapping table of the first ODU service processing unit determined by the timeslot allocating unit.

The timeslot allocating unit is configured to generate the synchronous frame period, determine the number of timeslots in the synchronous frame period that are occupied by the ODU frame and the slice length of the ODU frame according to the obtained rate of the ODU frame, an output port rate of the first ODU service processing unit, and the synchronous frame period, and determine, based on an interleaving allocation method, the output port timeslot mapping table of the first ODU service processing unit including a mapping relationship between an output port of the first ODU service processing unit and a timeslot in the synchronous frame period.

The timeslot allocating unit may further be configured to generate the synchronous frame period, determine the number of timeslots in the synchronous frame period that are occupied by the ODU frame and the slice length of the ODU frame according to the obtained rate of the ODU frame and the synchronous frame period and based on a mapping relationship between a preconfigured rate multiple of the ODU frame and the number of timeslots in the synchronous frame period that are occupied by the ODU frame, and determine, based on an interleaving allocation method, the output port timeslot mapping table of the first ODU service processing unit including a mapping relationship between an output port of the first ODU service processing unit and a timeslot in the synchronous frame period. The mapping relationship between the preconfigured rate multiple of the ODU frame and the number of timeslots in the synchronous frame period that are occupied by the ODU frame is specifically a mapping relationship between the rate of the ODU frame and the number of timeslots in the synchronous frame period that are occupied by the ODU frame with the rate. For example, in a synchronous frame period with 24 timeslots, when the rate of the ODU frame is 1.2 Gbps, the number of timeslots in the synchronous frame period that are occupied by the ODU frame with the rate is 3, and the slice length of the ODU frame encapsulated into the Ethernet frame is 212 bytes or 213 bytes; when the rate of the ODU frame is 2.5 Gbps, the number of timeslots in the synchronous frame period that are occupied by the ODU frame with the rate is 6, and the slice length of the ODU frame encapsulated into the Ethernet frame is 212 bytes or 213 bytes. It can be seen that, an increase multiple of the number of timeslots in the synchronous frame period that are occupied by the ODU frame is exactly equal to an increase multiple of the rate of the ODU frame corresponding to the number of timeslots, that is, 2 times. A mapping table of the preconfigured rate multiple the ODU frame may include more types of rates of the ODU frame; for example, when the rate of the ODU frame is 10 Gbps, the number of timeslots in the synchronous frame period that are occupied by the ODU frame with the rate is 24. The ODU service includes ODU0, ODU1, ODU2, ODU3, and ODU4 whose rates are 1.2 Gbit/s, 2.5 Gbit/s, 10 Gbit/s, 40 Gbit/s, and 100 Gbit/s respectively. In this embodiment of the present invention, the mapping relationship between the rate multiple of the ODU frame and the number of timeslots in the synchronous frame period that are occupied by the ODU frame may be set to a mapping relationship between the ODU frames with different rates and the number of timeslots in the synchronous frame period that are occupied by the ODU frame on the premise of various synchronous frame periods, the output port rate of the first ODU service processing unit and different numbers of payloads of Ethernet frames. Definitely, in this embodiment of the present invention, a person skilled in the art knows that, the first ODU service processing unit or modules or functional units (such as the Ethernet encapsulating unit) in the first ODU service processing unit may also determine the slice length of the ODU frame, and a specific process thereof is similar to the foregoing embodiment, which is not described herein again.

The timeslot allocating unit is connected to the switching output port allocating unit, the overhead extracting unit of the first ODU service processing unit, and the Ethernet encapsulating unit and the port distributing unit of the first ODU service processing unit. The timeslot allocating unit ensures, according to a timeslot interleaving allocating algorithm, discreteness and uniformity of timeslots in the synchronous frame period to which the ODU services are allocated, and meanwhile ensures that the traffic on the output port of the first ODU service processing unit is balanced and timeslot conflicts are reduced.

Further, the second ODU service processing unit in this embodiment of the present invention may further include an Ethernet decapsulating unit and an ODU framing unit. The Ethernet decapsulating unit is configured to decapsulate a received Ethernet frame according to an output port frame period timeslot table of the Ethernet switching unit determined by the switching output port allocating unit, and obtain bit stream data of an Ethernet payload; and the ODU framing unit is configured to encapsulate the bit stream data of the Ethernet payload into an ODU frame to send the ODU frame.

Further, this embodiment of the present invention may further include two or more first ODU service processing units. This embodiment of the present invention may further include two or more second ODU service processing units. The two or more first ODU service processing units are separately connected to an input port of the Ethernet switching unit. The two or more second ODU service processing units are separately connected to an output port of the Ethernet switching unit. The timeslot allocating unit is connected to the plurality of first ODU service processing units.

FIGS. 4a-4c show a timeslot mapping table and a frame period timeslot table corresponding to the second embodiment of the present invention. In the second embodiment of the present invention, the number of timeslots in a synchronous frame period is 24 in the embodiment of the present invention, and a service type is one type of ODU services. In this embodiment of the present invention, a first ODU service processing unit has two output ports, which are o1 and o2 respectively. In this embodiment of the present invention, payload length of each Ethernet frame is 256 bytes, and an output port rate of the first ODU service processing unit is 12 Gbps. In this embodiment of the present invention, the payload length of the Ethernet frame may range from 64 bytes to 1000 bytes.

A timeslot allocating unit determines, according to the number of timeslots in the synchronous frame period (24) and a rate of an ODU service (the ODU service in this embodiment of the present invention is ODU2, and the rate is 239/237×9 953 280 kbit/s), that an ODU2 frame needs to be encapsulated by using 24 Ethernet frames, that is, the number of timeslots in the whole synchronous frame period that are occupied by the ODU2 frame is 24.

A specific calculation process is as follows: the payload length of the Ethernet frame, which is 256 bytes, is multiplied by 8 and is then divided by the output port rate of the first ODU service processing unit (12 Gbps), so that timeslot duration of each Ethernet frame is calculated to be 170.6665 ns. Then, the output port of the first ODU service processing unit with the rate of 12 Gbps may send 5859375 Ethernet frames per second, or may send 244140.625 (5859375/24=244140.625) frame periods per second. In this embodiment of the present invention, a method used is as follows: first, the number of Ethernet frames needed for encapsulation of an ODU0 frame is calculated, and then the number of Ethernet frames needed for encapsulation of the ODU2 frame is calculated. A rate of the ODU0 is 1 244 160 kbit/s, and it may be calculated that 637.00992 (1244160*1000/8/244140.625=637.00992) bytes need to be transmitted in each frame period. If the Ethernet frame with the payload length 256 bytes is used for encapsulation, 637.00992/256=2.48832 Ethernet frames are needed. After the number of Ethernet frames is rounded, it may be known that, the ODU0 needs 3 Ethernet frame timeslots for encapsulation, and the number of bytes encapsulated by each Ethernet frame is 637.00992/3=212.33664 bytes. Because the length of bytes encapsulated by each Ethernet frame should be an integer, the length of the ODU0 encapsulated by each Ethernet frame is 212 bytes or 213 bytes, that is, the slice length of the ODU0 frame encapsulated by each Ethernet frame is 212 bytes or 213 bytes. It may be calculated, according to the rate of the ODU2 (239/237×9 953 280 kbit/s), that 5139.08424911392405 (239/237×9 953 280*1000/8/244140.625=5139.08424911392405) bytes need to be transmitted in each frame period. Because the rate of the ODU2 is approximately equal to a rate of 8 ODU0s and the ODU0 needs 3 Ethernet frame timeslots for encapsulation, 24 Ethernet frame timeslots are used for encapsulating the ODU2, and the number of bytes of the ODU2 encapsulated by each Ethernet frame is equal to 5139.08424911392405/24 (=214.12851037974683542) bytes. Because the length of the ODU2 encapsulated by each Ethernet frame is an integer, the slice length of the ODU2 encapsulated by each Ethernet frame is 214 bytes or 215 bytes.

By means of the foregoing method, it may be calculated that, when the ODU service is ODU1 (a rate of the ODU1=239/238×2 488 320 kbit/s), it is calculated that 239/238×2 488 320*1000/8=(239/238)*311040000 bytes need to be transmitted per second, so that it is calculated that (239/238)*311040000/244140.625=1279.3728645378 bytes need to be transmitted in each frame period, where 1279.3728645378/6213.2288107563. Six Ethernet frame timeslots are used for encapsulation, and the number of bytes of the ODU1 encapsulated by each Ethernet frame is approximately equal to 213.2288107563 bytes. Because the length of the ODU1 encapsulated by each Ethernet frame is an integer, the length of the ODU1 encapsulated by each Ethernet frame is 213 bytes or 214 bytes.

Definitely, in this embodiment of the present invention, a person skilled in the art knows that, the first ODU service processing unit or modules or functional units (such as the Ethernet encapsulating unit) in the first ODU service processing unit may also determine the slice length of the ODU frame, and a specific process thereof is similar to the foregoing embodiment, which is not described herein again.

FIG. 4(a) shows an output port timeslot mapping table of the first ODU service processing unit determined by the timeslot allocating unit.

As shown in FIG. 4(a), the ODU service is in locations of timeslots 1 to 24 that respectively correspond to output ports o1, o2, . . . , o1, and o2 of the first ODU service processing unit. Based on the timeslot mapping table shown in FIG. 4(a), the first ODU service processing unit sends the Ethernet frame to an Ethernet switching unit from a location of an output port corresponding to a timeslot.

FIG. 4(b) and FIG. 4(c) respectively show an input port frame period timeslot table of the Ethernet switching unit and an output port frame period timeslot table of the Ethernet switching unit generated by a switching output port allocating unit according to the timeslot mapping table. The Ethernet switching unit has two service input ports si1/si2 and two service output ports so1/so2, as shown in FIG. 4(b) and FIG. 4(c). In this embodiment of the present invention, in the input port frame period timeslot table of the Ethernet switching unit, the ODU service is in timeslots 1 to 24 that respectively correspond to the input ports si1, si2, . . . , si1, and si2. Correspondingly, the output port so2 of the Ethernet switching unit corresponds to a location of the timeslot 1 in the output port frame period timeslot table of the Ethernet switching unit, and subsequent timeslot sequence numbers 2 to 24 are in a fixed time sequence so1, so2, so1, so2, so1, . . . , and so1 shown in the figure by means of an interleaving allocation principle, that is, the Ethernet switching unit receives and forwards the Ethernet frame to a second ODU service processing unit at a corresponding timeslot and a corresponding output port of a Ethernet switching unit. Definitely, the output port so1 of the Ethernet switching unit may also correspond to the location of the timeslot 1; then, in the subsequent timeslot sequence numbers 2 to 24, sequence numbers of the output ports of the Ethernet switching unit are in a fixed time sequence so2, so1, so2, so1, . . . , and so2 by means of the interleaving allocation principle.

In specific implementation, the switching output port allocating unit generates the input port frame period timeslot table of the Ethernet switching unit and the output port frame period timeslot table of the Ethernet switching unit according to the timeslot mapping table generated by the timeslot allocating unit, and determines an allocation forwarding command of the Ethernet switching unit according to the input port frame period timeslot table of the Ethernet switching unit and the output port frame period timeslot table of the Ethernet switching unit. The Ethernet switching unit sends the Ethernet frame to the second ODU service processing unit according to a received allocation forwarding command of the Ethernet switching unit. The second ODU service processing unit is configured to decapsulate the received Ethernet frame according to the output port frame period timeslot table of the Ethernet switching unit determined by the switching output port allocating unit, obtain bit stream data of an Ethernet payload, and encapsulate the bit stream data of the Ethernet payload into an ODU frame to send the ODU frame.

In this embodiment of the present invention, an ODU service is forwarded according to an output port timeslot mapping table of a first ODU service processing unit and an allocation forwarding command of an Ethernet switching unit by using the first ODU service processing unit, a timeslot allocating unit, a switching output port allocating unit, the Ethernet switching unit, and a second ODU service processing unit, which solves the problem in the prior art where an ODU frame cannot be transmitted by an Ethernet switching unit, ensures that service congestion does not occur on a forwarding port of a transmission apparatus, and improves transmission quality of a communication network.

Figure 5:
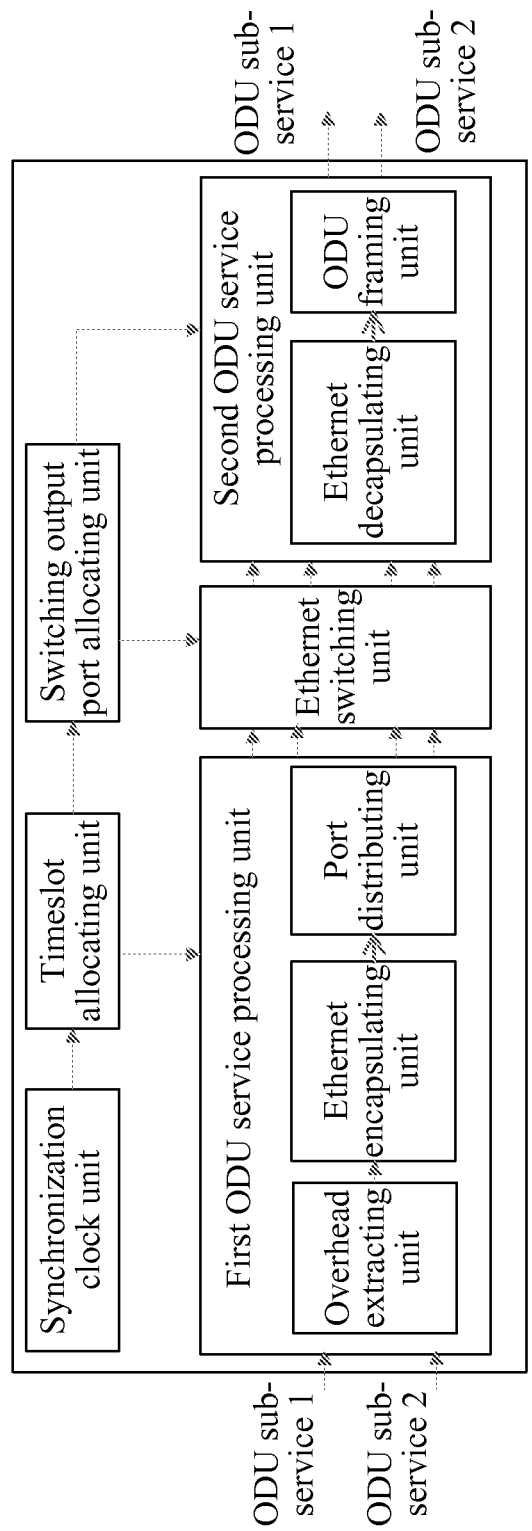
FIG. 5 is a schematic diagram of an ODU service transmission apparatus according to a third embodiment of the present invention.

FIG. 5 is a schematic diagram of an ODU service transmission apparatus according to a third embodiment of the present invention. The apparatus includes a synchronization clock unit, a first ODU service processing unit, a timeslot allocating unit, a switching output port allocating unit, an Ethernet switching unit, and a second ODU service processing unit. For detailed descriptions of functional modules of the apparatus, reference may be made to the descriptions of the ODU service transmission apparatus according to the foregoing second embodiment of the present invention. In this embodiment of the present invention, an ODU service includes at least two ODU sub-services, such as, an ODU sub-service 1 and an ODU sub-service 2.

FIGS. 6a-6c show a timeslot mapping table and a frame period timeslot table corresponding to the third embodiment of the present invention. In the third embodiment of the present invention, the number of timeslots in a synchronous frame period is 24 in the embodiment of the present invention, a service type is two ODU services (the ODU sub-service 1 and the ODU sub-service 2), and the ODU sub-service 1 and the ODU sub-service 2 are ODU2 (a rate is 239/237×9 953 280 kbit/s) and ODU1 (a rate is 239/238×2 488 320 kbit/s) respectively. In this embodiment of the present invention, the first ODU service processing unit has 4 output ports o1, o2, o3, and o4. FIG. 6a is an output port timeslot mapping table of the first ODU service processing unit. As shown in FIG. 6a, in this embodiment of the present invention, a payload length of each Ethernet frame is 256 bytes, and a transmission rate of an output port of the first ODU service processing unit is 12 Gbps. The timeslot allocating unit determines, according to the number of timeslots in the synchronous frame period (24) and the rates of the two ODU services (ODU2 and ODU1), that the ODU2 service needs to be encapsulated by using 24 Ethernet frames, that is, the number of timeslots in the synchronous frame period which an ODU2 frame needs to occupy is 24; however, the ODU1 occupies 6 timeslots in the whole synchronous frame period, that is, the number of timeslots in the synchronous frame period which an ODU1 frame needs to occupy is 6. For the ODU2 service, timeslots 1 to 24 respectively correspond to the output ports o1, o2, o3, o4, o1, o2, o3, . . . , o2, o3, and o4 of the first ODU service processing unit. For the ODU1 service, timeslots 1, 5, 9, 13, 17, and 21 respectively correspond to the output ports o2, o3, o4, o2, o3, and o4 of the first ODU service processing unit. Based on the timeslot mapping table shown in FIG. 6a, the first ODU service processing unit sends the Ethernet frame to the Ethernet switching unit from a location of an output port corresponding to a timeslot.

FIG. 6b and FIG. 6c respectively show an input port frame period timeslot table of the Ethernet switching unit and an output port frame period timeslot table of the Ethernet switching unit generated by the switching output port allocating unit according to the timeslot mapping table. In this embodiment of the present invention, the Ethernet switching unit has four service input ports si1/si2/si3/si4 and four service output ports so1/so2/so3/so4, as shown in FIG. 6b and FIG. 6c. In FIG. 6b, when the ODU sub-service 1 corresponds to the input port si1 at the timeslot 1, because only services in a same timeslot can be received or sent by a same port, the ODU sub-service 2 may correspond only to the si2, si3 or si4 at the timeslot 1. In this embodiment of the present invention, the ODU sub-service 2 corresponds to the si2 at the timeslot 1, and definitely, may also correspond to the si3 or si4. In this embodiment of the present invention, the rate of the ODU sub-service 1 is four times the rate of the ODU sub-service 2, and therefore, subsequent timeslot interleaving locations are separately at timeslot locations, such as timeslots 5, 9, 13, 17, and 21. A sequence of input ports of the Ethernet switching unit for the ODU sub-service 2 is a fixed time sequence si2, si3, and si4, and definitely, may also be a fixed time sequence si2, si4, and si3. Similarly, in FIG. 6c, in a location of the timeslot 1 in the output port frame period timeslot table of the Ethernet switching unit, when the ODU sub-service 1 corresponds to the output port so2 of the Ethernet switching unit, the ODU sub-service 2 may correspond to the so3 and may also correspond to the so4 or so1. In this embodiment of the present invention, the ODU sub-service 2 corresponds to the so3; in subsequent timeslot sequence numbers 5, 9, 13, 17, and 21, sequence numbers of the output ports are in a fixed time sequence so4, so1, so3, so4, and so1 by means of an interleaving allocation principle, as shown in the figure, that is, the Ethernet switching unit receives and forwards the Ethernet frame to the second ODU service processing unit at a corresponding timeslot and a corresponding output port of the Ethernet switching unit. Definitely, in the subsequent timeslot sequence numbers 5, 9, 13, 17, and 21, sequence numbers of the output ports may also be in a fixed time sequence so1, so4, so3, so1, and so4 by means of the interleaving allocation principle, as long as the processing is based on a principle that "in a same timeslot, a same input port or output port cannot be used to bear different services".

In specific implementation, the switching output port allocating unit generates the input port frame period timeslot table of the Ethernet switching unit and the output port frame period timeslot table of the Ethernet switching unit according to the timeslot mapping table generated by the timeslot allocating unit, and determines an allocation forwarding command of the Ethernet switching unit according to the input port frame period timeslot table of the Ethernet switching unit and the output port frame period timeslot table of the Ethernet switching unit. The Ethernet switching unit sends the Ethernet frame to the second ODU service processing unit according to a received allocation forwarding command of the Ethernet switching unit. The second ODU service processing unit is configured to decapsulate the received Ethernet frame according to the output port frame period timeslot table of the Ethernet switching unit determined by the switching output port allocating unit, obtain bit stream data of an Ethernet payload, and encapsulate the bit stream data of the Ethernet payload into an ODU frame to send the ODU frame.

In this embodiment of the present invention, an ODU service is forwarded according to an output port timeslot mapping table of a first ODU service processing unit and an allocation forwarding command of an Ethernet switching unit by using the first ODU service processing unit, a timeslot allocating unit, a switching output port allocating unit, the Ethernet switching unit, and a second ODU service processing unit, which solves the problem in the prior art where an ODU frame cannot be transmitted by an Ethernet switching unit, ensures that service congestion does not occur on a forwarding port of a transmission apparatus, and improves transmission quality of a communication network.

Figure 7:
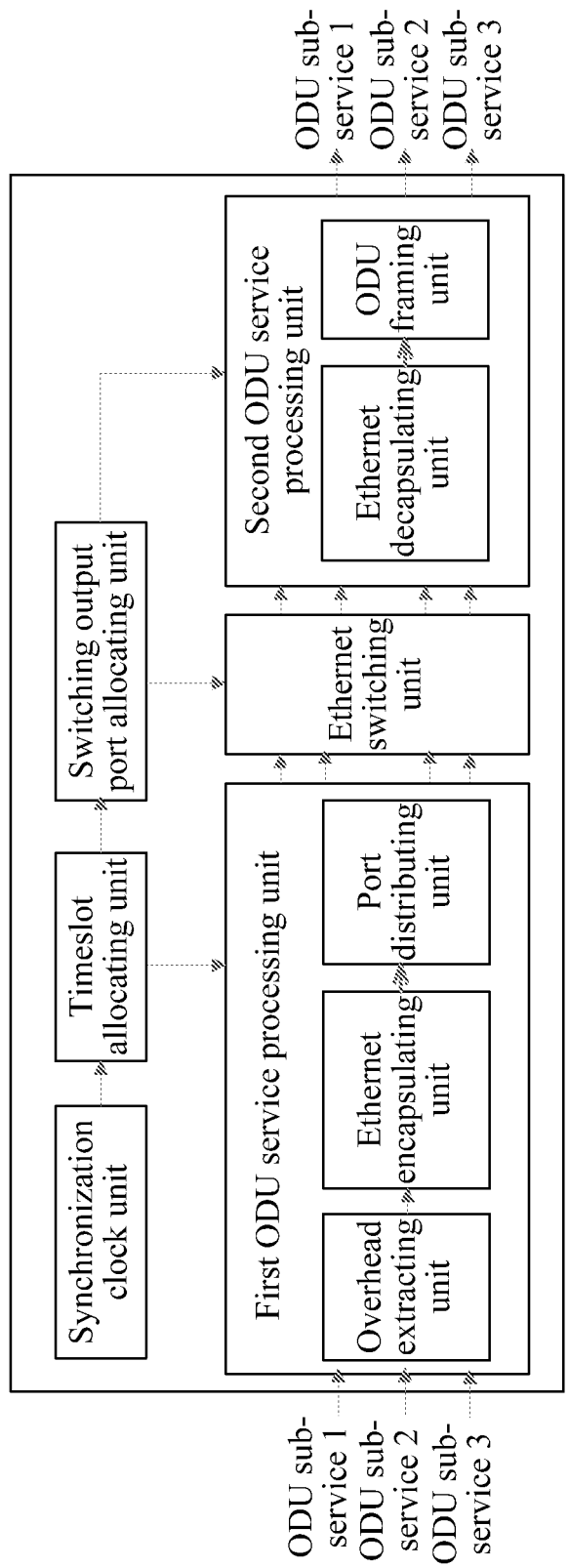
FIG. 7 is a schematic diagram of an ODU service transmission apparatus according to a fourth embodiment of the present invention.

FIG. 7 is a schematic diagram of an ODU service transmission apparatus according to a fourth embodiment of the present invention. The apparatus includes a synchronization clock unit, a first ODU service processing unit, a timeslot allocating unit, a switching output port allocating unit, an Ethernet switching unit, and a second ODU service processing unit. For detailed descriptions of functional modules of the apparatus, reference may be made to the descriptions of the ODU service transmission apparatus according to the foregoing second embodiment of the present invention. The at least two ODU sub-services included in an ODU service in this embodiment of the present invention are an ODU sub-service 1, an ODU sub-service 2, and an ODU sub-service 3, and timeslots in a fixed time sequence in a timeslot mapping table correspond to the three sub-services in the ODU service, which are the ODU sub-service 1, the ODU sub-service 2, and the ODU sub-service 3. The timeslots in the fixed time sequence may be connected to each other, or may be spaced by a random number of timeslots. Definitely, the random number of timeslots should be less than the number of timeslots in a synchronous frame period. In the fourth embodiment of the present invention, the number of timeslots in the synchronous frame period is 24 in this embodiment of the present invention, and a service type is three ODU sub-services. The first ODU service processing unit further includes an overhead extracting unit, an Ethernet encapsulating unit, and a port distributing unit. The overhead extracting unit is configured to extract overhead information of ODU frames in the ODU sub-service 1, the ODU sub-service 2, and the ODU sub-service 3. The Ethernet encapsulating unit is specifically configured to determine a rate of the ODU frame according to the overhead information of the ODU frame in the ODU sub-service 1, the ODU sub-service 2, and the ODU sub-service 3, and encapsulate the ODU frame into an Ethernet frame according to the rate of the ODU frame and a slice length of the ODU frame. The port distributing unit is configured to send the Ethernet frame to the Ethernet switching unit according to an output port timeslot mapping table of the first ODU service processing unit determined by the timeslot allocating unit. In this embodiment of the present invention, output ports of the first ODU service processing unit are o1, o2, o3, and o4. In this embodiment of the present invention, the ODU sub-service 1, the ODU sub-service 2, and the ODU sub-service 3 may separately correspond to the output ports of the first ODU service processing unit according to the number of timeslots in the synchronous frame period generated by the timeslot allocating unit (24), so as to generate the timeslot mapping table. The timeslot allocating unit ensures, according to a timeslot interleaving allocating algorithm, discreteness and uniformity of timeslots in the synchronous frame period to which the ODU services are allocated, and meanwhile ensures that the traffic on the output ports of the first ODU service processing unit is balanced and timeslot conflicts are reduced. The switching output port allocating unit ensures timeslot allocation of an input interface and an output interface of the Ethernet switching unit according to the timeslot interleaving allocating algorithm, so that the Ethernet switching unit forwards the received Ethernet frame to the second ODU service processing unit according to an allocation forwarding command of the Ethernet switching unit generated by the switching output port allocating unit.

FIGS. 8a-8c show a timeslot mapping table and a frame period timeslot table corresponding to the fourth embodiment of the present invention. In this embodiment of the present invention, the number of timeslots in the synchronous frame period is 24, and a service type is three ODU services, which are respectively the ODU sub-service 1 (it is specifically ODU2, and a rate is 239/237×9 953 280 kbit/s), the ODU sub-service 2 (it is specifically ODU1, and a rate is 239/238×2 488 320 kbit/s), and the ODU sub-service 3 (it is specifically ODU0, and a rate is 1 244 160 kbit/s). In this embodiment of the present invention, the first ODU service processing unit has 4 output ports o1, o2, o3, and o4. FIG. 8a is an output port timeslot mapping table of the first ODU service processing unit. As shown in FIG. 8a, in this embodiment of the present invention, a payload length of each Ethernet frame is 256 bytes, and a transmission rate of an output port of the first ODU service processing unit is 12 Gbps. The timeslot allocating unit determines, according to the number of timeslots in the synchronous frame period (24) and rates of the three ODU sub-services, that the ODU sub-service 1 needs to be encapsulated by using 24 Ethernet frames in one synchronous frame period, that is, the ODU frame occupies 24 timeslots in the whole synchronous frame period. The ODU sub-service 2 needs to be encapsulated by using 6 Ethernet frames, that is, the ODU sub-service 2 occupies 6 timeslots in the whole synchronous frame period. The ODU sub-service 3 needs to be encapsulated by using 3 Ethernet frames, that is, the ODU sub-service 3 occupies 3 timeslots in the whole synchronous frame period. As shown in FIG. 8a, at locations of timeslots 1 to 24, the ODU sub-service 1 corresponds to the output ports o1, o2, o3, o4, . . . , o1, o2, o3, and o4 of the first ODU service processing unit. At the locations of timeslots 1, 5, 9, 13, 17, and 21, the ODU sub-service 2 corresponds to the output ports o2, o3, o4, o2, o3, and o4 of the first ODU service processing unit. At the locations of timeslots 3, 11, and 19, the ODU sub-service 3 corresponds to the output ports o1, o1, and o1 of the first ODU service processing unit. Based on the timeslot mapping table shown in FIG. 8a, the first ODU service processing unit sends the Ethernet frame to the Ethernet switching unit from a location of an output port corresponding to a timeslot.

FIG. 8b and FIG. 8c respectively show an input port frame period timeslot table of the Ethernet switching unit and an output port frame period timeslot table of the Ethernet switching unit generated by the switching output port allocating unit according to the timeslot mapping table in FIG. 8a. In this embodiment of the present invention, the Ethernet switching unit has four service input ports si1/si2/si3/si4 and four service output ports so1/so2/so3/so4, as shown in FIG. 8b and FIG. 8c.

In FIG. 8b, when the ODU sub-service 1 corresponds to the input port si1 at the timeslot 1, because only services in a same timeslot can be received or sent by a same port, the ODU sub-service 2 may correspond only to the si2, si3 or si4 at the timeslot 1. In this embodiment of the present invention, the ODU sub-service 2 corresponds to the si2, and definitely, may also correspond to the si3 or si4. In this embodiment of the present invention, the rate of the ODU sub-service 1 is four times the rate of the ODU sub-service 2, and therefore, subsequent timeslot interleaving locations are separately in timeslot locations, such as timeslots 5, 9, 13, 17, and 21.

A sequence of input ports of the Ethernet switching unit for the ODU sub-service 2 is si2, si3, and si4, and definitely, may also be a fixed time sequence si2, si4, and si3. The ODU sub-service 3 corresponds to the input port si1 in a location of the timeslot 3. In locations of the subsequent timeslots 11 and 19, the ODU sub-service 3 may also correspond to the input port si1, indicating that the rate of the ODU sub-service 1 is 8 times the rate of the ODU sub-service 3. The ODU sub-service 3 may also be input in another timeslot or another input port, as long as the processing is based on a principle that "in a same timeslot, a same input port or output port cannot be used to bear different services".

Similarly, in FIG. 8c, in a location of the timeslot 1 in the output port frame period timeslot table of the Ethernet switching unit, when the ODU sub-service 1 corresponds to the output port so2 of the Ethernet switching unit, the ODU sub-service 2 may correspond to the so3, and may also correspond to the so4 or so1. In this embodiment of the present invention, the ODU sub-service 2 corresponds to the so3; in the subsequent timeslot sequence numbers 5, 9, 13, 17, and 21, sequence numbers of the output ports may be in a fixed time sequence so4, so1, so3, so4, and so1 by means of an interleaving allocation principle, as shown in the figure, that is, the Ethernet switching unit receives and forwards the Ethernet frame to the second ODU service processing unit at a corresponding timeslot and a corresponding output port of the Ethernet switching unit. Definitely, in the subsequent timeslot sequence numbers 5, 9, 13, 17, and 21, the sequence numbers of the output ports may also be in a fixed time sequence so1, so4, so3, so1, and so4 by means of the interleaving allocation principle, as long as the processing is based on the principle that "in a same timeslot, a same input port or output port cannot be used to bear different services".

The ODU sub-service 3 corresponds to the output port so2 in a location of the timeslot 3. In locations of the subsequent timeslots 11, and 19, the ODU sub-service 3 may also correspond to the output port so2, indicating that the rate of the ODU sub-service 1 is 8 times the rate of the ODU sub-service 3. The ODU sub-service 3 may also be input in another timeslot or another input port, as long as the processing is based on the principle that "in a same timeslot, a same input port or output port cannot be used to bear different services".

In specific implementation, the switching output port allocating unit generates the input port frame period timeslot table of the Ethernet switching unit and the output port frame period timeslot table of the Ethernet switching unit according to the timeslot mapping table generated by the timeslot allocating unit, and determines an allocation forwarding command of the Ethernet switching unit according to the input port frame period timeslot table of the Ethernet switching unit and the output port frame period timeslot table of the Ethernet switching unit. The Ethernet switching unit sends the Ethernet frame to the second ODU service processing unit according to a received allocation forwarding command of the Ethernet switching unit. The second ODU service processing unit is configured to decapsulate the received Ethernet frame according to the output port frame period timeslot table of the Ethernet switching unit determined by the switching output port allocating unit, obtain bit stream data of an Ethernet payload, and encapsulate the bit stream data of the Ethernet payload into a high-order ODU frame to send the high-order ODU frame.

In this embodiment of the present invention, an ODU service is forwarded according to an output port timeslot mapping table of a first ODU service processing unit and an allocation forwarding command of an Ethernet switching unit by using the first ODU service processing unit, a timeslot allocating unit, a switching output port allocating unit, the Ethernet switching unit, and a second ODU service processing unit, which solves the problem in the prior art where an ODU frame cannot be transmitted by an Ethernet switching unit, ensures that service congestion does not occur on a forwarding port of a transmission apparatus, and improves transmission quality of a communication network.

FIGS. 9a-9c show a timeslot mapping table and a frame period timeslot table corresponding to another embodiment of the present invention. With reference to detailed descriptions of the foregoing embodiment, an ODU service in this embodiment of the present invention is an ODU sub-service 1 and an ODU sub-service 2, and the number of timeslots in a period is 12. Specifically, for detailed mapping relationship between an output port of a first ODU service processing unit and a timeslot in a synchronous frame period and a mapping relationship between an input port and an output port of an Ethernet switching unit and a timeslot in a synchronous frame period, reference may be made to FIG. 9a, FIG. 9b, and FIG. 9c.

Specifically, in this embodiment of the present invention, the ODU sub-service 1 and the ODU sub-service 2 may be ODU2 (a rate is 239/237×9 953 280 kbit/s) and ODU1 (a rate is 239/238×2 488 320 kbit/s) respectively. If a payload length of each Ethernet frame is 256 bytes, a transmission rate of the first ODU service processing unit is 12 Gbps, it is determined that the ODU2 needs to be encapsulated by using 12 Ethernet frames according to the number of timeslots in the synchronous frame period (12), the rate of the ODU1 and the rate of the ODU2, that is, the ODU2 service occupies the whole synchronous frame period, and the ODU1 service needs to occupy only 3 timeslots in the synchronous frame period, as shown in FIG. 9a.

FIGS. 10a-10c show a timeslot mapping table and a frame period timeslot table corresponding to another embodiment of the present invention. With reference to detailed descriptions of the foregoing embodiment, an ODU service in this embodiment of the present invention is one type of services, and the number of timeslots in a period is 12. Specifically, for detailed mapping relationship between an output port of a first ODU service processing unit and a timeslot in a synchronous frame period and a mapping relationship between an input port and an output port of an Ethernet switching unit and a timeslot in a synchronous frame period, reference may be made to FIG. 10a, FIG. 10b, and FIG. 10c.

Specifically, in this embodiment of the present invention, the ODU service may be ODU2 (a rate is 239/237×9 953 280 kbit/s). If a payload length of each Ethernet frame is 256 bytes, and a transmission rate of a port distributing unit is 12 Gbps, it is determined that the ODU2 needs to be encapsulated by using 12 Ethernet frames according to the number of timeslots in the synchronous frame period (12) and the rate of the ODU2, that is, the ODU2 service occupies the whole synchronous frame period, as shown in FIG. 10a.

Figure 11:
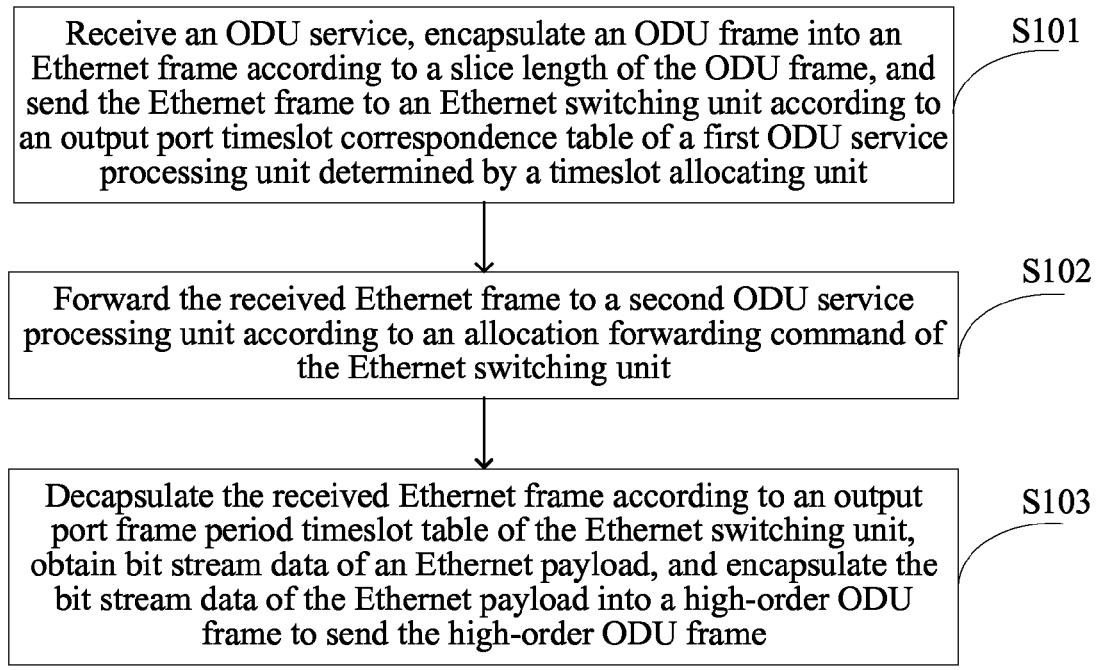
FIG. 11 is a flowchart of an ODU service transmission method according to another embodiment of the present invention.

FIG. 11 is a schematic diagram of an ODU service transmission method according to another embodiment of the present invention.

Step S101: Receive an ODU service, encapsulate an ODU frame into an Ethernet frame according to a slice length of the ODU frame, and send the Ethernet frame to an Ethernet switching unit according to an output port timeslot mapping table of a first ODU service processing unit determined by a timeslot allocating unit, where the timeslot mapping table is determined according to a synchronous frame period, a rate of the ODU frame, and the number of output ports of the first ODU service processing unit.

Step S102: Forward the received Ethernet frame to a second ODU service processing unit according to an allocation forwarding command of the Ethernet switching unit, where the allocation forwarding command of the Ethernet switching unit is determined according to an input port frame period timeslot table of the Ethernet switching unit and an output port frame period timeslot table of the Ethernet switching unit, the output port frame period timeslot table of the Ethernet switching unit is determined according to the input port frame period timeslot table of the Ethernet switching unit, and the input port frame period timeslot table of the Ethernet switching unit is determined according to the output port timeslot mapping table of the first ODU service processing unit determined by the timeslot allocating unit.

Step S103: Decapsulate the received Ethernet frame according to the output port frame period timeslot table of the Ethernet switching unit, obtain bit stream data of an Ethernet payload, and encapsulate the bit stream data of the Ethernet payload into a high-order ODU frame to send the high-order ODU frame.

Further, this embodiment of the present invention may further include: generating a clock signal, where the clock signal is used for synchronizing reference time of the synchronous frame period so that each frame period of the synchronous frame period is synchronous in time.

Further, in this embodiment of the present invention, the step of receiving an ODU service, encapsulating an ODU frame into an Ethernet frame according to a slice length of the ODU frame, and sending the Ethernet frame to an Ethernet switching unit according to an output port timeslot mapping table of a first ODU service processing unit determined by a timeslot allocating unit, is specifically: receiving the ODU service, extracting overhead information of the ODU frame in the ODU service, identifying the ODU service according to the overhead information, and obtaining a type of the ODU frame in the ODU service; determining a rate of the ODU frame according to the extracted overhead information, and encapsulating the ODU frame into the Ethernet frame according to the rate of the ODU frame and the slice length of the ODU frame; and sending the Ethernet frame to the Ethernet switching unit according to the output port timeslot mapping table of the first ODU service processing unit determined by the timeslot allocating unit.

Further, the determining of the timeslot mapping table is specifically generating the synchronous frame period, determining the number of timeslots in the synchronous frame period that are occupied by the ODU frame and the slice length of the ODU frame according to the obtained rate of the ODU frame, an output port rate of the first ODU service processing unit, and the synchronous frame period, and determining, based on an interleaving allocation method, the output port timeslot mapping table of the first ODU service processing unit including a mapping relationship between an output port of the first ODU service processing unit and a timeslot in the synchronous frame period.

Further, the determining of the timeslot mapping table is specifically generating the synchronous frame period, determining the number of timeslots in the synchronous frame period that are occupied by the ODU frame and the slice length of the ODU frame according to the obtained rate of the ODU frame and the synchronous frame period and based on a mapping relationship between a rate multiple of the ODU frame and the number of timeslots in the synchronous frame period that are occupied by the ODU frame, and determining, based on an interleaving allocation method, the output port timeslot mapping table of the first ODU service processing unit including a mapping relationship between an output port of the first ODU service processing unit and a timeslot in the synchronous frame period. The mapping relationship between the preconfigured rate multiple of the ODU frame and the number of timeslots in the synchronous frame period that are occupied by the ODU frame is specifically a mapping relationship between the rate of the ODU frame and the number of timeslots in the synchronous frame period that are occupied by the ODU frame with the rate. For example, in a synchronous frame period with 24 timeslots, when the rate of the ODU frame is 1.2 Gbps, the number of timeslots in the synchronous frame period that are occupied by the ODU frame with the rate is 3, and the slice length of the ODU frame encapsulated into the Ethernet frame is 212 bytes or 213 bytes; when the rate of the ODU frame is 2.5 Gbps, the number of timeslots in the synchronous frame period that are occupied by the ODU frame with the rate is 6, and the slice length of the ODU frame encapsulated into the Ethernet frame is 212 bytes or 213 bytes. It can be seen that, an increase multiple of the number of timeslots in the synchronous frame period that are occupied by the ODU frame is exactly equal to an increase multiple of the rate of the ODU frame corresponding to the number of timeslots, that is, 2 times. A mapping table of the preconfigured rate multiple of the ODU frame may include more types of rates of the ODU frame; for example, when the rate of the ODU frame is 10 Gbps, the number of timeslots in the synchronous frame period that are occupied by the ODU frame with the rate is 24. The ODU service includes ODU0, ODU1, ODU2, ODU3, and ODU4 whose rates are 1.2 Gbit/s, 2.5 Gbit/s, 10 Gbit/s, 40 Gbit/s, and 100 Gbit/s respectively. In this embodiment of the present invention, the mapping relationship between the rate multiple of the ODU frame and the number of timeslots in the synchronous frame period that are occupied by the ODU frame may be set to a mapping relationship between the ODU frames with different rates and the number of timeslots in the synchronous frame period that are occupied by the ODU frames on the premise of various synchronous frame periods, the output port rate of the first ODU service processing unit and different numbers of payloads of Ethernet frames. Definitely, in this embodiment of the present invention, a person skilled in the art knows that, the first ODU service processing unit or modules or functional units (such as the Ethernet encapsulating unit) in the first ODU service processing unit may also determine the slice length of the ODU frame, and a specific process thereof is similar to the foregoing embodiment, which is not described herein again.

Reference may be made to Embodiment 1 to Embodiment 4 of the present invention for more detailed descriptions of each step of the ODU service transmission method in this embodiment of the present invention, which are not described herein again.

In this embodiment of the present invention, an ODU service is forwarded according to an output port timeslot mapping table of a first ODU service processing unit and an allocation forwarding command of an Ethernet switching unit by using the first ODU service processing unit, a timeslot allocating unit, a switching output port allocating unit, the Ethernet switching unit, and a second ODU service processing unit, which solves the problem in the prior art where an ODU frame cannot be transmitted by an Ethernet switching unit, ensures that service congestion does not occur on a forwarding port of a transmission apparatus, and improves transmission quality of a communication network.

A person of ordinary skill in the prior art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Figure 12:
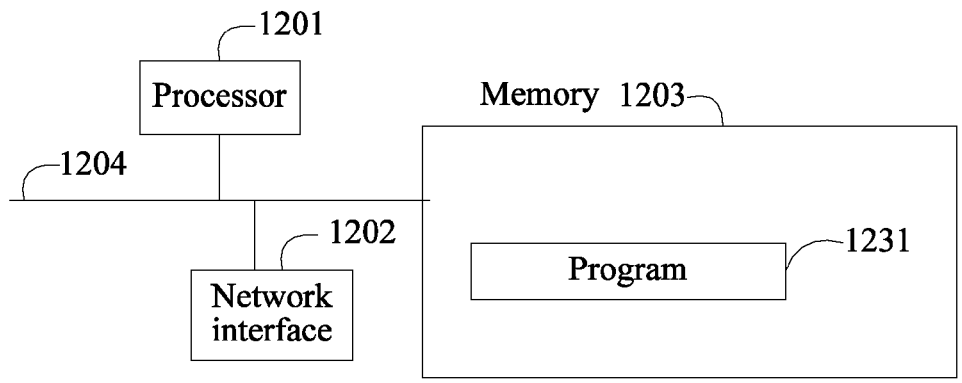
FIG. 12 is a schematic structural diagram of a first ODU service processing unit according to another embodiment of the present invention.

In another embodiment of the present invention, a first ODU service processing unit shown in FIG. 12 includes at least one processor 1201 (for example, a CPU), at least one network interface 1202 or another communication interface, a memory 1203, and at least one communication bus 1204, which are configured to implement communication connections between these apparatuses. The processor 1201 is configured to execute an executable module, for example, a computer program, stored in the memory 1203. The memory 1203 may include a high-speed random access memory (RAM), and may further include a non-volatile memory, for example, at least one magnetic disk memory. A communication connection between a system gateway and at least one other network element is implemented by using the at least one network interface 1202 (which may be either wired or wireless) and by using the Internet, a wide area network, a local area network, a metropolitan area network, and the like.

In some implementation manners, the memory 1203 stores a program 1231, and the program 1231 may be executed by the processor 1201. The program is used to receive an ODU service, encapsulate an ODU frame into an Ethernet frame according to a slice length of the ODU frame, and send the Ethernet frame to an Ethernet switching unit according to an output port timeslot mapping table of a first ODU service processing unit determined by a timeslot allocating unit, where the timeslot mapping table is determined according to a synchronous frame period, a rate of the ODU frame and the number of output ports of the first ODU service processing unit.

In another embodiment of the present invention, for the structure of a second ODU service processing unit, reference may be made to FIG. 12. The second ODU service processing unit may also include at least one processor 1301 (for example, a CPU), at least one network interface 1302 or another communication interface, a memory 1303, and at least one communication bus 1304, which are configured to implement communication connections between these apparatuses. The processor 1301 is configured to execute an executable module, for example, a computer program, stored in the memory 1303. The memory 1303 may include a high-speed random access memory (RAM), and may further include a non-volatile memory, for example, at least one magnetic disk memory. A communication connection between a system gateway and at least one other network element is implemented by using the at least one network interface 1302 (which may be either wired or wireless) and by using the Internet, a wide area network, a local area network, a metropolitan area network, and the like.

In some implementation manners, the memory 1303 stores a program 1331, and the program 1331 may be executed by the processor 1301. The program is used to decapsulate a received Ethernet frame according to an output port frame period timeslot table of an Ethernet switching unit, obtain bit stream data of an Ethernet payload, and encapsulate the bit stream data of the Ethernet payload into a high-order ODU frame to send the high-order ODU frame.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical channel data unit (ODU) service transmission apparatus, comprising:
   a first ODU service processing unit;
   a timeslot allocating unit;
   a switching output port allocating unit;
   an Ethernet switching unit; and
   a second ODU service processing unit:
   wherein the first ODU service processing unit is configured to receive an ODU service, encapsulate an ODU frame into an Ethernet frame according to a slice length of the ODU frame, and send the Ethernet frame to the Ethernet switching unit according to an output port timeslot mapping table of the first ODU service processing unit determined by the timeslot allocating unit;
   wherein the timeslot allocating unit is configured to generate a synchronous frame period, and determine the output port timeslot mapping table of the first ODU service processing unit according to an obtained rate of the ODU frame and a number of output ports of the first ODU service processing unit;
   wherein the switching output port allocating unit is configured to determine an input port frame period timeslot table of the Ethernet switching unit according to the output port timeslot mapping table, determine an output port frame period timeslot table of the Ethernet switching unit according to the input port frame period timeslot table, and determine an allocation forwarding command of the Ethernet switching unit according to the input port frame period timeslot table and the output port frame period timeslot table;
   wherein the Ethernet switching unit is configured to forward the received Ethernet frame to the second ODU service processing unit according to the allocation forwarding command of the Ethernet switching unit;
   wherein the second ODU service processing unit is configured to decapsulate the received Ethernet frame according to the output port frame period timeslot table, obtain bit stream data of an Ethernet payload, and encapsulate the bit stream data of the Ethernet payload into the ODU frame to send the ODU frame;
   wherein the first ODU service processing unit comprises an overhead extracting unit, an Ethernet encapsulating unit, and a port distributing unit;
   wherein the overhead extracting unit is configured to receive the ODU service, extract overhead information of the ODU frame in the ODU service, identify the ODU service according to the overhead information, and obtain a type of the ODU frame in the ODU service;
   wherein the Ethernet encapsulating unit is configured to determine the rate of the ODU frame according to the extracted overhead information, and encapsulate the ODU frame into the Ethernet frame according to the rate of the ODU frame and the slice length of the ODU frame; and
   wherein the port distributing unit is configured to send the Ethernet frame to the Ethernet switching unit according to the output port timeslot mapping table of the first ODU service processing unit determined by the timeslot allocating unit.

2. The apparatus according to claim 1, wherein the apparatus further comprises a synchronization clock unit, configured to provide a clock signal for the timeslot allocating unit, wherein the clock signal is used for synchronizing reference time of the synchronous frame period so that each frame period generated by the timeslot allocating unit is synchronous in time.

3. The apparatus according to claim 1, wherein the timeslot allocating unit is configured to generate the synchronous frame period, to determine a number of timeslots in the synchronous frame period that are occupied by the ODU frame and the slice length of the ODU frame according to the obtained rate of the ODU frame, an output port rate of the first ODU service processing unit, and the synchronous frame period, and to determine, based on an interleaving allocation method, the output port timeslot mapping table of the first ODU service processing unit comprising a mapping relationship between an output port of the first ODU service processing unit and a timeslot in the synchronous frame period.

4. The apparatus according to claim 1, wherein the timeslot allocating unit is configured to generate the synchronous frame period, determine a number of timeslots in the synchronous frame period that are occupied by the ODU frame and the slice length of the ODU frame according to the obtained rate of the ODU frame and the synchronous frame period and based on a mapping relationship between a rate multiple of the ODU frame and the number of timeslots in the synchronous frame period that are occupied by the ODU frame, and determine, based on an interleaving allocation method, the output port timeslot mapping table of the first ODU service processing unit comprising a mapping relationship between an output port of the first ODU service processing unit and a timeslot in the synchronous frame period.

5. An apparatus, comprising:
   a first optical channel data unit (ODU) service processing unit;
   a timeslot allocating unit;
   a switching output port allocating unit;
   an Ethernet switching unit; and
   a second ODU service processing unit;
   wherein the first ODU service processing unit is configured to receive an ODU service that comprises an ODU frame, to encapsulate the ODU frame into an Ethernet frame according to a slice length of the ODU frame, and to send the Ethernet frame to the Ethernet switching unit according to a table of a mapping between output ports of the first ODU service processing unit and timeslots determined by the timeslot allocating unit;
   wherein the timeslot allocating unit is configured to generate a synchronous frame period, and to determine the table of the mapping between output ports of the first ODU service processing unit and timeslots according to an obtained rate of the ODU frame and a number of output ports of the first ODU service processing unit;
   wherein the switching output port allocating unit is configured to determine a table of a mapping between input ports of the Ethernet switching unit and timeslots in a frame period according to the table of the mapping between output ports of the first ODU service processing unit and timeslots, to determine a table of a mapping between output ports of the Ethernet switching unit and timeslots in a frame period according to the table of the mapping between the input ports of the Ethernet switching unit and timeslots in a frame period, and to determine an allocation forwarding command of the Ethernet switching unit according to the table of the mapping between the input ports of the Ethernet switching unit and timeslots in a frame period and the table of the mapping between the output ports of the Ethernet switching unit and timeslots in a frame period;

wherein the Ethernet switching unit is configured to forward the received Ethernet frame to the second ODU service processing unit according to the allocation forwarding command of the Ethernet switching unit;

wherein the second ODU service processing unit is configured to decapsulate the received Ethernet frame according to the table of the mapping between the output ports of the Ethernet switching unit and timeslots in a frame period, to obtain bit stream data of the payload of the decapsulated Ethernet frame, to encapsulate the bit stream data of the payload of the decapsulated Ethernet-into the ODU frame, and to send the ODU frame;

wherein the first ODU service processing unit comprises an overhead extracting unit, an Ethernet encapsulating unit, and a port distributing unit;

wherein the overhead extracting unit is configured to receive the ODU service, to extract overhead information of the ODU frame in the ODU service, to identify the ODU service according to the overhead information, and to obtain a type of the ODU frame in the ODU service;

wherein the Ethernet encapsulating unit is configured to determine the rate of the ODU frame according to the extracted overhead information, and to encapsulate the ODU frame into the Ethernet frame according to the rate of the ODU frame and the slice length of the ODU frame; and wherein the port distributing unit is configured to send the Ethernet frame to the Ethernet switching unit according to the table of the mapping between output ports of the first ODU service processing unit and timeslots determined by the timeslot allocating unit.

6. The apparatus according to claim 5, wherein the apparatus further comprises a synchronization clock unit, configured to provide a clock signal for the timeslot allocating unit, wherein the clock signal is used for synchronizing reference time of the synchronous frame period so that each frame period generated by the timeslot allocating unit is synchronous in time.

7. The apparatus according to claim 5, wherein the timeslot allocating unit is configured to generate the synchronous frame period, to determine a number of timeslots in the synchronous frame period that are occupied by the ODU frame and the slice length of the ODU frame according to the obtained rate of the ODU frame, an output port rate of the first ODU service processing unit, and the synchronous frame period, and to determine, based on an interleaving allocation method, the table of the mapping between output ports of the first ODU service processing unit and timeslots comprising a mapping relationship between an output port of the first ODU service processing unit and a timeslot in the synchronous frame period.

8. The apparatus according to claim 5, wherein the timeslot allocating unit is configured to generate the synchronous frame period, to determine a number of timeslots in the synchronous frame period that are occupied by the ODU frame and the slice length of the ODU frame according to the obtained rate of the ODU frame and the synchronous frame period and based on a mapping relationship between a rate multiple of the ODU frame and the number of timeslots in the synchronous frame period that are occupied by the ODU frame, and to determine, based on an interleaving allocation method, the table of the mapping between output ports of the first ODU service processing unit and timeslots comprising a mapping relationship between an output port of the first ODU service processing unit and a timeslot in the synchronous frame period.

9. A method, comprising:

receiving an optical channel data unit (ODU) service;

encapsulating an ODU frame into an Ethernet frame according to a slice length of the ODU frame;

sending the Ethernet frame to an Ethernet switching unit according to a table of a mapping between output ports of the first ODU service processing unit and timeslots, wherein the table of the mapping between output ports of the first ODU service processing unit and timeslots is determined according to a synchronous frame period, a rate of the ODU frame and a number of output ports of the first ODU service processing unit;

forwarding the received Ethernet frame to a second ODU service processing unit according to an allocation forwarding command of the Ethernet switching unit, wherein the allocation forwarding command of the Ethernet switching unit is determined according to a table of a mapping between input ports of the Ethernet switching unit and timeslots in a frame period and a table of a mapping between output ports of the Ethernet switching unit and timeslots in a frame period, the table of the mapping between the output ports of the Ethernet switching unit and timeslots in a frame period is determined according to the table of the mapping between the input ports of the Ethernet switching unit and timeslots in a frame period, and the table of the mapping between the input ports of the Ethernet switching unit and timeslots in a frame period is determined according to the table of the mapping between output ports of the first ODU service processing unit and timeslots;

decapsulating the received Ethernet frame according to the table of the mapping between the output ports of the Ethernet switching unit and timeslots in a frame period;

obtaining bit stream data of an Ethernet payload;

encapsulating the bit stream data of the payload of the decapsulated Ethernet into a high-order ODU frame; and sending the high-order ODU frame;

wherein the steps of receiving the ODU service, encapsulating the ODU frame into the Ethernet frame, and sending the Ethernet frame to the Ethernet switching unit comprise:

receiving the ODU service;

extracting overhead information of the ODU frame in the ODU service;

identifying the ODU service according to the overhead information, and obtaining a type of the ODU frame in the ODU service;

determining the rate of the ODU frame according to the extracted overhead information;

encapsulating the ODU frame into the Ethernet frame according to the rate of the ODU frame and the slice length of the ODU frame; and sending the Ethernet frame to the Ethernet switching unit according to the table of the mapping between output ports of the first ODU service processing unit and timeslots.

10. The method according to claim 9, wherein the method further comprises generating a clock signal that is used for synchronizing reference time of the synchronous frame period so that each frame period of the synchronous frame period is synchronous in time.

11. The method according to claim 9, wherein determining the table of the mapping between output ports of the first ODU service processing unit and timeslots comprises:

generating the synchronous frame period;

determining a number of timeslots in the synchronous frame period that are occupied by the ODU frame and the slice length of the ODU frame according to the obtained rate of the ODU frame, an output port rate of the first ODU service processing unit, and the synchronous frame period; and determining, based on an interleaving allocation method, the table of the mapping between output ports of the first ODU service processing unit and timeslots comprising a mapping relationship between an output port of the first ODU service processing unit and a timeslot in the synchronous frame period.

12. The method according to claim 9, wherein determining table of the mapping between output ports of the first ODU service processing unit and timeslots comprises:

generating the synchronous frame period;

determining a number of timeslots in the synchronous frame period that are occupied by the ODU frame and the slice length of the ODU frame according to the obtained rate of the ODU frame and the synchronous frame period and based on a mapping relationship between a rate multiple of the ODU frame and the number of timeslots in the synchronous frame period that are occupied by the ODU frame; and determining, based on an interleaving allocation method, the table of the mapping between output ports of the first ODU service processing unit and timeslots comprising a mapping relationship between an output port of the first ODU service processing unit and a timeslot in the synchronous frame period.

* * * * *